UNITED STATES PATENT OFFICE.

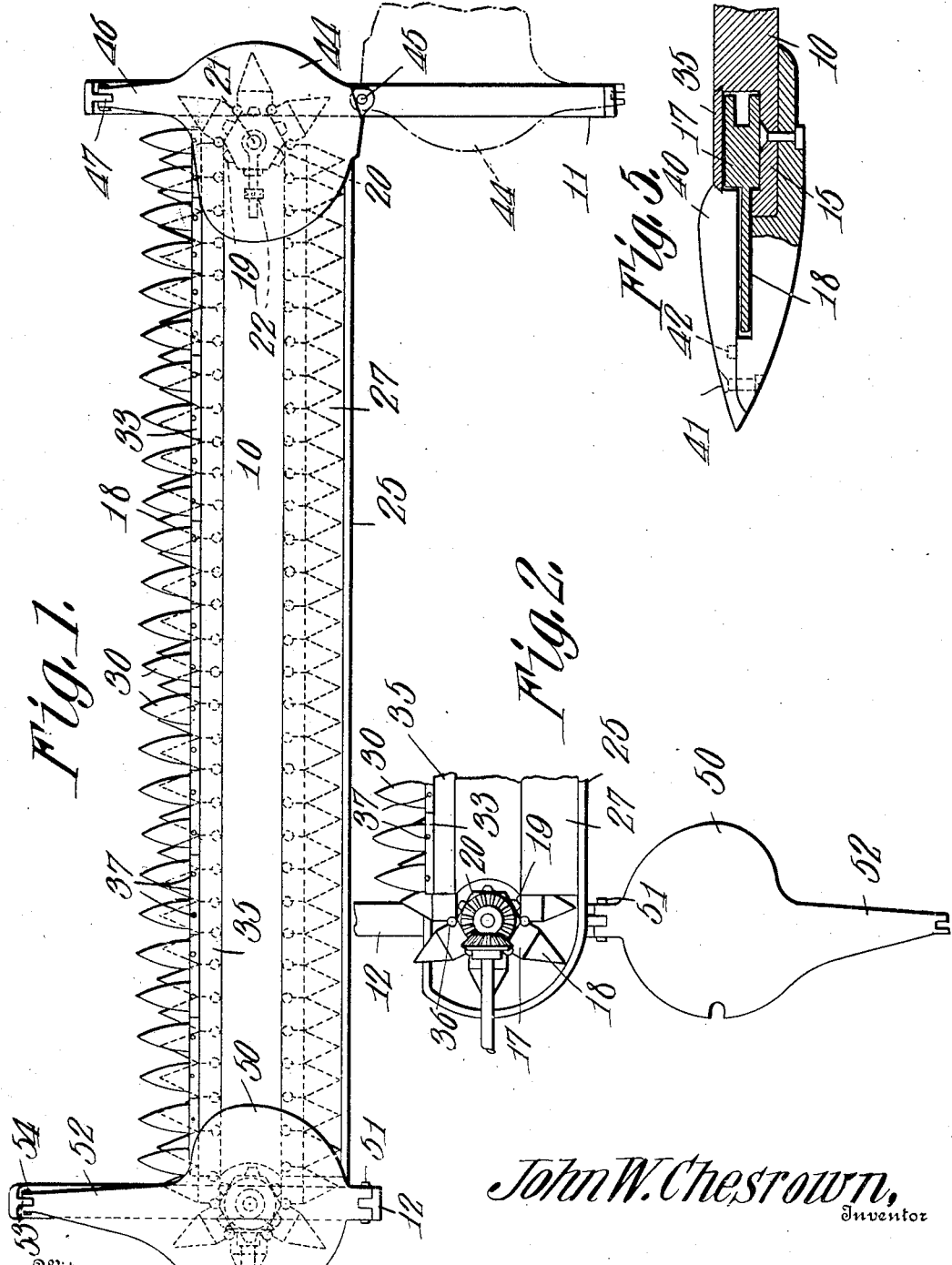

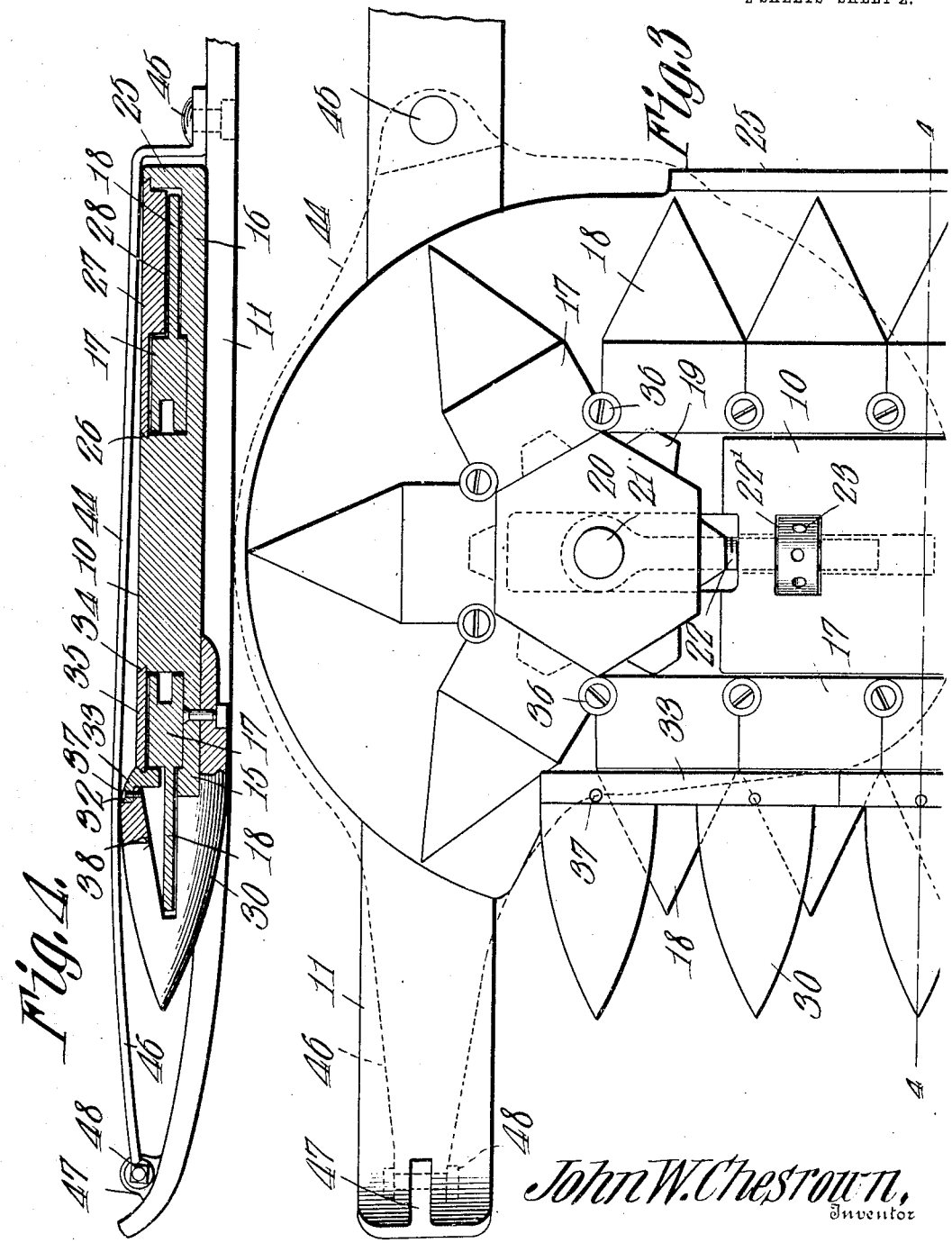

JOHN W. CHESROWN, OF MANSFIELD, OHIO.

CUTTER-BAR.

No. 892,402.     Specification of Letters Patent.     Patented July 7, 1908.

Application filed November 16, 1907. Serial No. 402,538.

*To all whom it may concern:*

Be it known that I, JOHN W. CHESROWN, a citizen of the United States, residing at Mansfield, in the county of Richland and State of Ohio, have invented a new and useful Cutter-Bar, of which the following is a specification.

This invention relates to cutter bars for mowing machines, and has for its principal object to provide a structure in which convenient access may be had to any of the parts in case repairs are necessary.

A further object of the invention is to provide a device of this class in which any one or more of the cutter teeth may be readily removed without dismantling the structure.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a plan view of a cutter bar constructed in accordance with the invention. Fig. 2 is a detail plan view of the inner portion of the bar showing the cover or cap in open position. Fig. 3 is a similar view of the outer end of the bar drawn to an enlarged scale. Fig. 4 is a transverse sectional view on the line 4—4 of Fig. 3. Fig. 5 is a detail sectional view of a portion of the forward edge of the cutter bar illustrating a slight modification.

Similar numerals of reference are employed to indicate corresponding parts throughout the several figures of the drawings.

The main body of the device comprises a bar 10 that is supported at the outer end by an elongated shoe 11, and at the inner end by a shorter shoe 12, the forward ends of the shoes being curved upward in the usual manner in order to permit the passage of the bar over irregular surfaces. The opposite sides of the bar 10 are reduced in thickness to form front and rear flanges 15 and 16, and each of these flanges is grooved adjacent to the opposite sides of the main body of the bar for the reception of the lower edges of the cutting knives 17. Each knife is in the form of an approximately rectangular block or base, from which projects a triangular blade 18, and the blocks are pivotally connected near their rear edges in such manner as to permit swinging movement in but one direction. The entire series of blocks is connected in the form of an endless chain or belt, and the rear portion of each block is recessed for the reception of a tooth 19 on a sprocket wheel 20, there being one of such sprocket wheels at each end of the cutter bar. The opposite ends of the cutter bar are cut away to the plane of the upper faces of the flanges 15 and 16, in order to afford space for the introduction of the sprocket wheels 20, and the carrying stud or shaft 21 of the outermost wheel is supported in an opening formed at the end of a bolt 22, which fits within an opening formed in the bar 10 and is provided with a nut 22' mounted in a recess in said bar, so that by turning the nut, the shaft or stud 21 may be moved outward for the purpose of keeping the chain taut.

The rear edge of the bar 10 is turned up to form a vertical flange 25, and the inner face of this flange, as well as the adjacent face of the main body of the bar 10, is provided with a V-shaped groove for the reception of an endwise removable cover plate 27 which is slid in place for the purpose of covering and protecting the rear portion of the cutting chain. In order to properly guide the chain, the cover plate is provided with a downwardly extending rib or flange portion 28 which will fit closely against the upper face of the blade 18.

The triangular cutting teeth 18 project beyond the front of the cutter bar and coact with the fingers 30 in cutting the grass or other vegetation. The fingers 30 are provided at their upper rear ends with grooves or seats for the reception of the flanges 32 of removable blocks 33, each block being of a length greater than the space covered by two adjacent teeth, although it may be slightly more or less as occasion requires. The inner faces of all of the blocks, as well as the adjacent vertical face of the main body of block 10 are provided with V-shaped grooves 34 arranged for the reception of an endwise removable cover plate 35, this cover plate extending over all of the base blocks 17 of the cutting knives, and serving to prevent the entrance of foreign matter.

Where the plate 35 is removed from position access may be had to the base portion of any of the cutting blades, and if any blade is to be removed, the connecting screws 36 which unite it to the adjacent blades are removed. The block 33 that covers the projecting portion of the blade is then detached after the removal of the securing screws 37, and the faulty blade may be detached and another substituted therefor. In order to permit the convenient removal of the blade, the knife receiving recess of the finger 30 is provided with an inclined upper wall 38, so that the recess is tapered to an extent sufficient to allow the base block of the blade to be lifted up and the blade withdrawn in the direction of the main body of the bar 10.

As a modification of this construction, the finger 30 may be made with a removable section 40, as shown in Fig. 5, and connected thereto by a screw 41. In order to hold the section 40 in proper position, the base of the finger has a pin 42 that is arranged to enter a recess formed in the lower face of the removable section.

The slidable cover plates 27 and 35 do not extend the full length of the cutter bar, and provision must, therefore, be made for protecting the end portions of the cutting chain. For this purpose, the outer end of the bar is protected by a cover plate 44 that is pivoted on a stud 45 carried by the shoe. The front of the cover plate is provided with a projecting arm 46 having a bifurcated end that is connected to a lug 47 at the front end of the shoe by means of a detachable bolt 48. This cover plate extends over the end teeth of the sprocket wheel, and the sprocket wheel adjusting device, and to examine these parts, it is merely necessary to remove the bolt 48 and then swing the plate around to open position with the pin 45 as a center of movement.

It will be noted that the cover plate 44 is cut away to follow the contour of the outer end of the bar and to pass beyond the outer side of the end finger 30, so that the cutting action may take place fully up to the outermost shoe, and no portion of the length of the bar from shoe to shoe is idle.

The inner end of the cutter bar, the chain and the sprocket wheel, are protected by a cover plate 50, the rear end of which is connected to the rear end of the shoe 12 by a hinge pin 51, so that the cover plate is arranged to swing vertically for the purpose of exposing the cutting blades and sprocket wheels at the inner end of the bar. From the outer portion of the cover plate projects an arm 52 that is connected to a lug 53 at the forward end of the shoe by means of a detachable bolt 54.

The construction is such that all the parts of the mechanism, excepting the cutting blades proper at the front of the machine are fully covered and protected, while access may be had to any part of the bar for the removal of any defective blade and the substitution therefor of a new one.

I claim:—

1. In combination, a main bar having its opposite sides recessed and grooved to form front and rear supporting flanges, cutters supported by the flanges and connected together to form an endless chain, sprocket wheels for guiding said chain, endwise slidable cover plates extending over the upper portions of the cutters, and movable cover plates arranged to protect the end portions of the cutting chain and sprocket wheels.

2. In combination, a main bar having its opposite sides recessed to form front and rear supporting flanges, detachable cutters pivotally connected to each other to form an endless chain supported by said flanges, sprocket wheels around which said chain passes, cover plates extending over the cutters, pivotally mounted covers for the end portions of the chain and sprocket wheels, supporting shoes for the inner and outer ends of the bar, and fingers secured to the bar and arranged to coact with the cutters on the forward run of the chain.

3. In combination, a main bar having its opposite sides cut away to form a pair of front and rear flanges, there being a vertically disposed flange at the rear edge of the rear flange, a plurality of cutters detachably connected to each other and forming an endless chain, sprocket wheels for guiding said chain; endwise slidable covers extending over the front and rear runs of the chain, pivotally mounted plates extending over the covers, the end portions of the chain and the sprocket wheels, the rear run of the chain being wholly inclosed by the flanges and cover plate, and the cutters of the forward run of the chain projecting beyond the edge of the front flange.

4. In combination, a main bar, the opposite sides of which are cut away to form a pair of front and rear flanges, there being a vertical flange at the rear edge of the rear flange, said vertical flange and the adjacent vertical wall of the bar being provided with grooves a plurality of detachably connected cutters arranged in the form of an endless chain, an endwise slidable cover plate fitting in said grooves to protect the rear run of the chain, fingers projecting from the front flange and provided with tapered recesses through which the cutters of the forward run pass, sectional metallic strips secured to the fingers, the rear edges of said strips being grooved, and the adjacent vertical edge of the main bar being also grooved, and a slidable cover plate fitting within said grooves and protecting the rear ends of the forward run of the cutters.

5. In a cutter bar, a main carrying bar, a tooth projecting therefrom and having a tapered recess opening at its rear end, a series of blocks connecting adjacent fingers, means for detachably securing said blocks to the fingers, and a cutting chain formed of detachably connected cutters, the blades of which extend into the finger recesses.

In testimony that I claim the foregoing as my own, I have hereto affixed my signature in the presence of two witnesses.

JOHN W. CHESROWN.

Witnesses:
C. E. S. DOYLE,
FRANK S. APPLEMAN.